(12) United States Patent
Rocket

(10) Patent No.: US 6,662,680 B2
(45) Date of Patent: Dec. 16, 2003

(54) DEVICE AND METHOD FOR ATTACHING A SUPPLEMENTAL SET OF HANDLEBARS TO A BICYCLE

(76) Inventor: Peter Rocket, 250 Plaza Blvd., Suite A-31, Morrisville, PA (US) 19067

( * ) Notice: Subject to any disclaimer, the term of this patent is extended or adjusted under 35 U.S.C. 154(b) by 0 days.

(21) Appl. No.: 10/117,158

(22) Filed: Apr. 8, 2002

(65) Prior Publication Data

US 2002/0108465 A1 Aug. 15, 2002

Related U.S. Application Data

(63) Continuation-in-part of application No. 09/572,161, filed on May 17, 2000.

(51) Int. Cl.[7] .......................... B62K 21/16; B62K 21/12
(52) U.S. Cl. ...................... 74/551.3; 74/551.1; 74/551.8
(58) Field of Search ............................. 74/551.1–551.8; 280/290, 289, 293, 288.4

(56) References Cited

U.S. PATENT DOCUMENTS

| | | | | |
|---|---|---|---|---|
| 586,591 A | * | 7/1897 | Burbank | 74/551.8 |
| 586,897 A | * | 7/1897 | Godfrey | 74/551.3 |
| 626,736 A | * | 6/1899 | Taulbee | 74/551.8 |
| 734,742 A | * | 7/1903 | Patrick | 74/551.3 |
| 2,229,778 A | * | 1/1941 | Taulbee | 280/290 |
| 3,567,250 A | * | 3/1971 | Wolf | 280/289 |
| 4,276,787 A | * | 7/1981 | Kellner | 74/552 |
| 4,705,269 A | * | 11/1987 | DeBoer et al. | 280/232 X |
| 5,078,391 A | * | 1/1992 | Moore | 74/551.8 X |
| 5,148,327 A | * | 9/1992 | Gaxiola | 280/288.4 X |
| 5,154,094 A | * | 10/1992 | Klieber | 74/551.1 |
| 5,195,394 A | * | 3/1993 | Latta | 74/551.8 |
| 5,197,350 A | * | 3/1993 | Borromeo | 74/551.8 |
| 5,326,122 A | * | 7/1994 | Duffy | 280/288.4 |
| 5,429,013 A | * | 7/1995 | Taylor et al. | 74/551.1 |
| 6,120,050 A | * | 9/2000 | Tillim | 280/293 |

FOREIGN PATENT DOCUMENTS

| | | | | |
|---|---|---|---|---|
| DE | 4445204 A1 | * | 6/1996 | 74/551.8 |
| FR | 2668745 | * | 5/1992 | 74/551.8 |
| GB | 2293800 A | * | 4/1996 | 74/551.8 |
| GB | 2304084 A | * | 3/1997 | 74/551.8 |

* cited by examiner

Primary Examiner—Vinh T. Luong
(74) Attorney, Agent, or Firm—LaMorte & Associates

(57) ABSTRACT

A system that adds a secondary handlebar to a bicycle that already is fitted with a primary set of handlebars. The system includes a secondary handlebar. The secondary handlebar is supported by a neck element. The neck element is attached to the steering post of the bicycle using a clamping assembly. The clamping assembly can engage the neck element at a variety of different points. Consequently, the height at which the neck element supports the secondary handlebar over the steering post can be selectively adjusted. Furthermore, at least one pivot adjustment is disposed between the steering post and the secondary handlebar. The pivot adjustment enables the secondary handlebar to be selectively adjusted along an arcuate path. As a result, the secondary handlebar can be adjusted both height and position in order to match the ergonomic needs of a particular rider.

14 Claims, 3 Drawing Sheets

DEVICE AND METHOD FOR ATTACHING A SUPPLEMENTAL SET OF HANDLEBARS TO A BICYCLE

RELATED APPLICATIONS

This application is a Continuation-In-Part of U.S. patent application Ser. No. 09/572,161 filed May 17, 2000 now abandoned.

BACKGROUND OF THE INVENTION

1. Field of the Invention

In general, the present invention relates to handlebar assemblies for bicycles. More particularly, the present invention relates to supplemental handlebars that can be retroactively added to a bicycle, thereby providing a bicycle having a primary set of handlebars with an additional secondary set of handlebars.

2. Description of the Prior Art

Bicycles come in a large variety of shapes and styles. A modern bicycle for an adult typically has adjustable gears and hand operated brakes. The levers for controlling the operation of the gears are commonly attached to the handlebars of the bicycle. Additionally, the control levers for controlling the brakes of the bicycle are also traditionally attached to the handlebars of the bicycle. In that way, a person riding the bicycle can change gears and/or apply the brakes without having to remove his/her hands from the handlebars.

The configuration of a bicycle's handlebars typically depends upon the style of the bicycle. Racing bicycles typically have handlebars with curved handles. As such, the person riding the bicycle must bend sharply at the waste to reach the handlebars. This puts the rider in an aerodynamic racing position. However, bicycles used for mountain biking typically have straight, high handlebars that enable a person to sit in a much more erect position while they hold the handlebars. This provides the rider with more balance as the bicycle travels over uneven ground at lower speeds.

Many bicycle rides prefer racing handlebars when they are riding on paved streets. However, mountain bike handlebars are preferred when riding on park paths and other uneven surfaces. It takes a great deal to time and effort to change the handlebars on a bicycle. Besides changing the handlebars themselves, the brake controls and gear selectors have to be removed and installed on the replaced handlebars. On a bicycle, the cables used to interconnect the gear selectors and the brakes to control levers on the handlebars are precisely adjusted. Accordingly, if a person were with change handlebars from racing handlebars to mountain bike handlebars, the gear selectors cables and brakes cable would have to be adjusted after they were transferred between the handlebars.

Due to the large amount of time and effort it takes to change the handlebars on a bicycle, owners rarely, if ever, change the style of handlebars they have on their bicycles. Rather, many bicyclists either endure the use of the wrong style handlebars for a given riding condition or have more than one bicycle that they use at different times.

In order to make a bicycle comfortable for different types of riding conditions, a rider may be tempted to simply attach two different sets of handlebars to a bicycle. This solution, of course, has many problems. One problem is that traditional bicycles steering forks have necks that can only be attached to a single set of handlebars. Accordingly, if a second set of handlebars were to be added to the bicycle, that second set of handlebars would have to be attached to the bicycle in an unconventional manner. A more imposing problem is one of safety. If a second set of handlebars is attached to a bicycle above the primary set of handlebars, the second set of handlebars would obstruct a bicycle rider from reaching the gear shifters and the hand brakes that are mounted to the primary set of handlebars. Consequently, although a second set of handlebars may make riding a bicycle more comfortable, that same second set of handlebars will prevent a rider from rapidly reaching the brakes and gearing controls of the bicycle. This problem can be avoided by mounting brake controls and gearing controls to both the primary handlebars and the secondary handlebars. However, such a solution is both difficult and expensive to implement.

Over the years, there have been many attempts to attach various secondary structures to a set of handlebars, thereby enabling the bicycle to be steered comfortable at different seating orientations. However, to prevent the secondary structure from obstructing a rider's access to the primary set of handlebars, the secondary structure was typically conformed as a solitary steering bar that extends upward from the center of the primary handlebars. The primary handlebars can be used when the rider was leaning over on the seat and the steering bar can be used when the rider is seated upright on the bicycle. Such prior art steering bars are exemplified by U.S. Pat. No. 734,742 to Patrick, entitled Steering Device. However, it is hard to steer a bicycle and maintain good balance using a steering bar. Accordingly, such devices never became popular in the general public.

On occasions, secondary structures are attached to a bicycle's primary handlebars for reasons other than to assist steering. For example, there are many bicycle baskets that attach to the handlebars of a bicycle. In U.S. Pat. No. 586,591 to Burbank, entitled Bicycle Attachment, a lantern holder is attached to the handlebars of a bicycle. The lantern hold has a small horizontal handle. However, if grasped by the hands of a rider, such a small handle cannot be effectively used to steer the bicycle. This is because the handle is not mounted in ergonomically comfortable positions for the bicycle rider. Furthermore, the small size of the handle does not provide enough leverage to enable a rider to safely steer the bicycle.

A need therefore exists for a set of supplemental handlebars that can be retroactively added to a bicycle, wherein the supplemental handlebars are comfortably positioned, provide adequate leverage for steering and do not impede access to the controls on the primary handlebars. This need is met by the present invention as described and claimed below.

SUMMARY OF THE INVENTION

The present invention is a system that adds a secondary handlebar to a bicycle that already is fitted with a primary set of handlebars. The system includes a secondary handlebar. The secondary handlebar is supported by a neck element. The neck element is attached to the steering post of the bicycle using a clamping assembly. The clamping assembly can engage the neck element at a variety of different points. Consequently, the height at which the neck element supports the secondary handlebar over the steering post can be selectively adjusted. Furthermore, at least one pivot adjustment is disposed between the steering post and the secondary handlebar. The pivot adjustment enables the secondary handlebar to be selectively adjusted along an arcuate path. As a result, the secondary handlebar can be adjusted both height and position in order to match the ergonomic needs of a particular rider.

BRIEF DESCRIPTION OF THE DRAWINGS

For a better understanding of the present invention, reference is made to the following description of an exemplary embodiment thereof, considered in conjunction with the following drawings, in which.

DETAILED DESCRIPTION OF THE DRAWINGS

Figure 1:
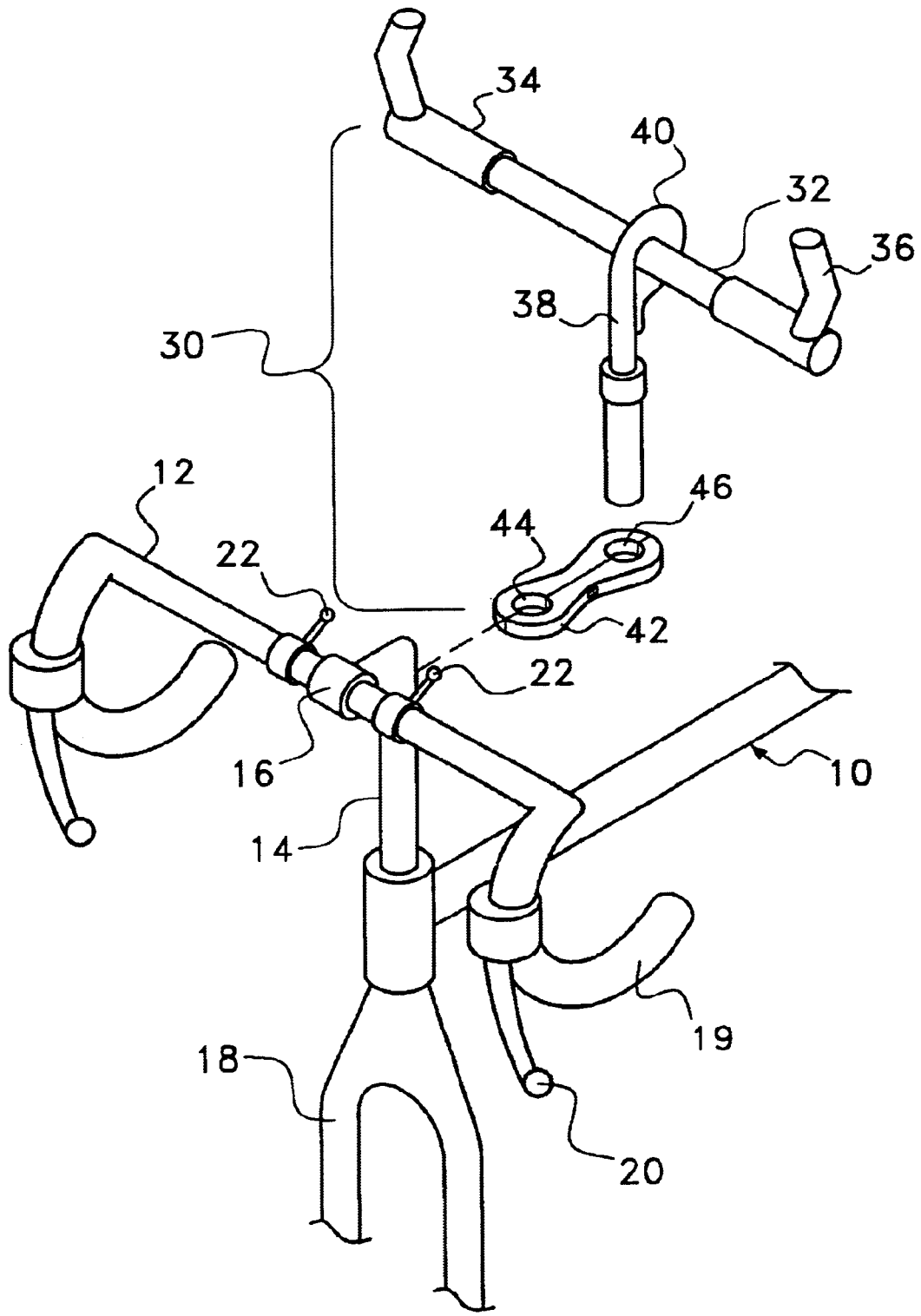
FIG. 1 is an exploded view of an exemplary embodiment of supplemental handlebar assembly shown with the segment of a bicycle.

Referring to FIG. 1, a segment of a bicycle 10 is shown. The bicycle 10 has a set of primary handlebars 12 that are configured as racing handlebars. Such a handlebar configuration is common for bicycles designed for adults that are to be ridden on paved roads. The primary handlebars 12 are held in place on the steering post 14 of the bicycle 10 by a mechanical clamp 16. The steering post 14 of the bicycle is joined to the front fork 18 of the bicycle 10. Accordingly, when the primary handlebars 12 are turned, the steering post 14 turns and the front fork 18 of the bicycle 10 turns.

The primary handlebars 12 have a racing configuration and thus have a curved descending section 19 that extend from a horizontal section. When a person rides the bicycle 10, that person's hands typically rest on the curved descending sections 19 of the handlebars 12. As is shown in FIG. 1, hand brake levers 20 are positioned on the curved descending sections 19 of the primary handlebars 12. In this manner, the hand brake levers 20 are positioned immediately adjacent the rider's hands. Levers 22 for controlling the gear selection mechanisms are also attached to the primary handlebars 12. The gear selection control levers 22 are most typically mounted to the primary handlebars 12 on either side of the bicycle's steering post 14.

The present invention includes a supplemental handlebar system 30 that attaches to the primary set of handlebars 12. The supplemental handlebar system 30 includes a secondary handlebar 32 that has the configuration a mountain bike's handlebars. Accordingly, the present invention supplemental handlebar system 30 enables mountain bike handlebars to be retroactively added to bicycles that have racing style handlebars.

The term "mountain bike", when applied to a style of handlebars, is a general term of art that describes a handlebar that is essentially horizontal, wherein a bicycle rider grasps the handlebars on the horizontal surface. This enables the bicycle rider to sit in a much more erect posture than would the use of racing style handlebars.

In the prior art, there are many types of mountain bike style handlebars. Many of these prior art mountain bike handlebars can be adapted for used as part of the present invention system. In FIG. 1, a simple example of mountain bike style handlebar is shown. Such an embodiment is merely exemplary and it should be understood that other styles of mountain bike handlebars can be adapted for use as part of the supplemental handlebar system 30. In FIG. 1, the secondary handlebar 32 is a horizontal bar, the horizontal bar need not be a straight bar, but may or may not embody some bends in the horizontal plane. Optional comfort pads 34 are positioned on the secondary handlebar 32 at positions where the bicycle rider's hands will rest. Optional handle elements 36 may extend upwardly from the ends of the secondary handlebar 32. Such handle elements 36 are common features of mountain bike style handlebars. Such handle elements 36 serve three primary functions. First, they prevent a rider's hands from slipping off the secondary handlebar 32 when grasping the secondary handlebar 32. Second, they protect the hands from contacting objects, such as braches, when the bicycle 10 is being ridden off-road. Lastly, the handle elements 36 provide a way to grasp the secondary handle 32 bar that relieves stress on the wrists of the rider. Although such handle elements 36 are popular in the form of many mountain bike style handlebars, they are only an optional part of the present invention secondary handlebar system 30.

The secondary handlebar 32 is held in place by a neck element 38. The neck element 38 is an elongated structure that terminates at its top with a clamp 40. The secondary handlebar 32 passes through the clamp 40, wherein the clamp 40 joins the neck element 38 to the secondary handlebar 32. By having the secondary handlebar 32 engaged by the clamp 40 at the top of the neck element 38, the secondary handlebar 32 can be adjusted by loosening the clamp 40 and rotating the secondary handlebar 32. Such an adjustment will adjust the angles at which the handle elements 36 radially extend from the secondary handlebar 32.

Although the illustrated embodiment shows that the secondary handlebar 32 is attached to the neck element 38 with a mechanical clamp 40, it should be understood that the neck element 38 can be welded in place or otherwise manufactured as part of the secondary handlebar 32. Such an alternate configuration decreases the cost of the assembly, but eliminates the ability of the secondary handlebar to be rotatably adjusted.

A clamp assembly 42 is provided that attaches the neck element 38 to the bicycle 12. The clamp assembly 42 has a first set of clamping jaws 44 at one end that is configured to engage the steering post 14 of the bicycle 12. The clamp assembly 42 has a second set of clamping jaws 46 at its opposite end that are configured to engage the neck element 38 of the secondary handlebar system 30. The clamp assembly 42 can be attached to the steering post 14 of the bicycle 12 at any point along the length of the bicycle's steering post 14. Furthermore, the clamp assembly 42 can be attached to the bicycle's steering post 14 so that is either extends forward from the bicycle's steering post 14, away from the rider, or backward from the bicycle's steering post 14, toward the rider.

The second set of clamping jaws 46 on the clamp assembly 42 can engage the neck element 38 at various points along its length. Accordingly, the height at which the neck element 38 extends above the clamp assembly 42 can be selectively adjusted. Since the neck element 38 supports the secondary handlebars 32, the height of the secondary handlebar 32 can be selectively adjusted by adjusting where the clamp assembly 42 engages the neck element 38 that supports the secondary handlebars 32.

Figure 2:
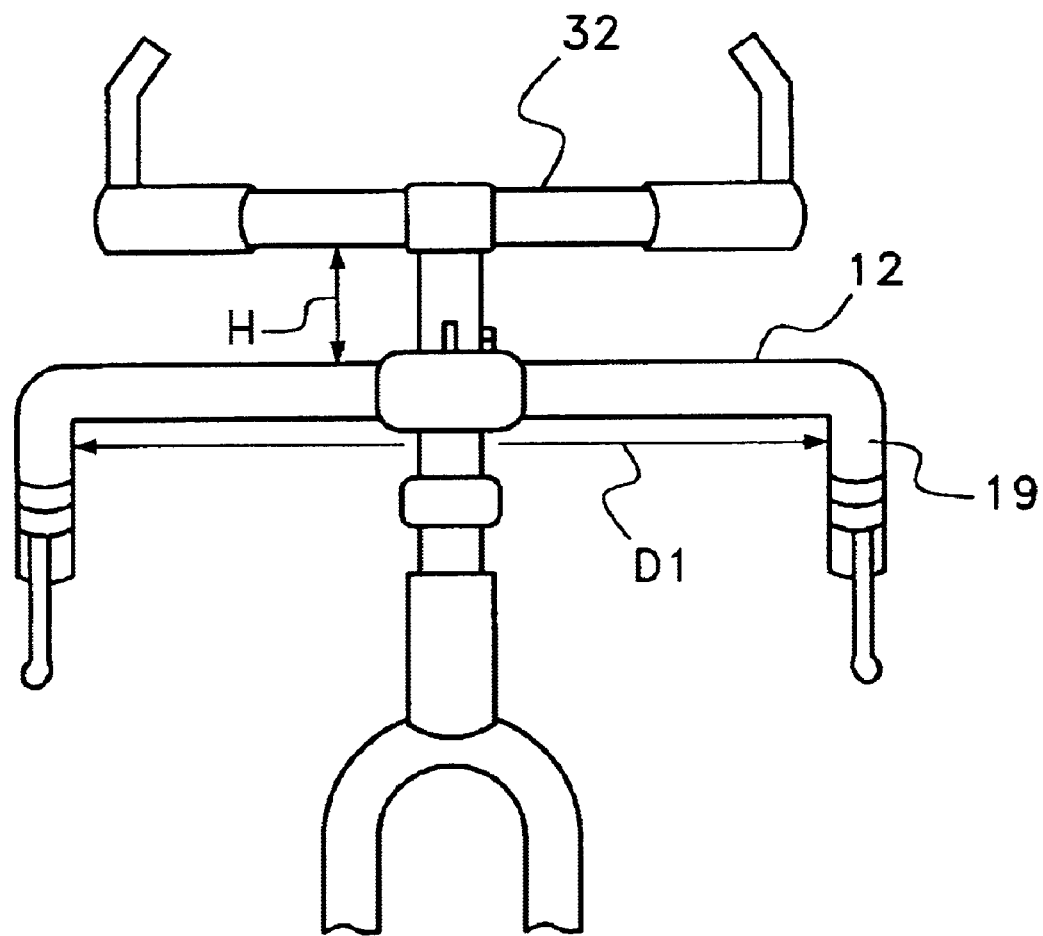
FIG. 2 is a front view of the supplemental handlebar assembly and segment of bicycle shown in FIG. 1.

Referring to FIG. 2, it can be seen that the secondary handlebar 32 are supported a selected height H above the primary handlebar 12. The selected height H is selectively adjustable. Accordingly, bicycle rider of different heights and arm lengths can each selectively adjust the height of the secondary handlebar 32 to a comfortable position. Furthermore, from FIG. 2, it can be seen that curved handle sections 19 of the primary handlebar 12 are spaced a distance D1 apart. The length of the secondary handlebar 32 is selected to be no longer than the distance D1 between curved handle sections 19 on the primary handlebar 12. In this manner, the secondary handlebar 32 does not obstruct access to the primary handlebar 12 when a person is riding the bicycle 10. Yet, the secondary handlebar 32 is long enough to provide good leverage needed to safely turn the bicycle 10.

Figure 3:
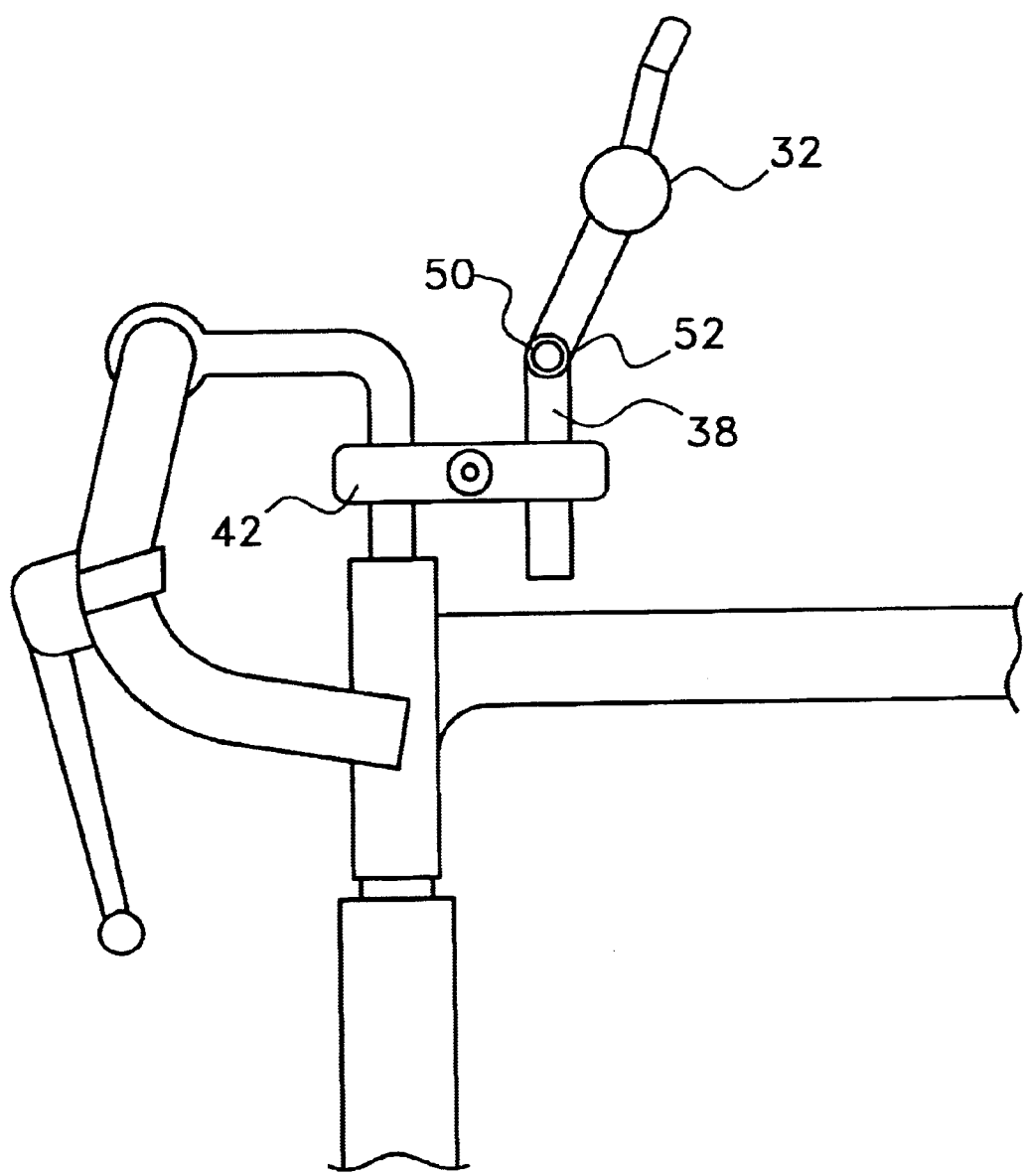
FIG. 3 is a side view of the embodiment of FIG. 2.

Referring to FIG. 3, it can be seen that an adjustment pivot 50 may be optionally located in the structure of the neck element 38. The adjustment pivot 50 can enable the top of the neck element 38 to be rotated about the adjustment pivot 50 relative the bottom of the neck pivot 38. Once adjusted as desired, the adjustment pivot 50 can be locked into a set position with a locking nut 52. The adjustment pivot 50 therefore enables the top of the neck element 38 and the secondary handlebar 32 it supports to be selectively adjusted through a range of movement. This enables the lateral position of the secondary handlebar 32 to be selectively adjusted to the comfort of the bicycle rider.

It will be understood that the same range of adjustment created by the adjustment pivot 50 in the neck element 38 can be achieved by placing an adjustment pivot in the clamp assembly 42 between the two ends of the clamp assembly 42. Accordingly, although an adjustment pivot 50 is only illustrated in the neck element 38, the scope of the present invention is also intended to include adjustment pivots disposed in the clamp assembly 42.

From the above, it should be understood that the embodiment of the present invention specifically illustrated and described is merely exemplary and that a person skilled in the art can make many modifications to the shown embodiment. For instance, the configuration of the secondary handlebar can be altered. The position of the adjustment pivots can be changed and separate parts can be manufactured as unitary units. All such modifications and alternate embodiments are intended to be included within the scope of the present invention as set forth in the claims below.

What is claimed is:

1. On a bicycle having a steering post that supports a primary set of handle bars, a device that attaches to the steering post comprising:

a secondary handlebar that includes bar;

comfort pads disposed around said bar;

a neck element extending from said secondary handlebar;

a clamping assembly that selectively engages the steering post and said neck element to mechanically connect said neck element to the steering post so that said neck element supports said bar of said secondary handlebar in a horizontal plane, wherein said clamping assembly can selectively engage said neck element at a plurality of points, thereby enabling said secondary handlebar to be selectively adjusted in position relative said clamping assembly.

2. The device according to claim 1, further including a pivot adjustment disposed between said secondary handlebar and said clamping assembly.

3. The device according to claim 1, wherein said neck element includes a clamp that engages said secondary handlebar, wherein said clamp enables said secondary handlebar to be selectively rotated to a selected position within said clamp.

4. The device according to claim 1, further including handle elements extend radially from said bar.

5. The device according to claim 1, wherein said clamping assembly includes a first set of clamping jaws that engage the steering post and a second set of clamping jaws that engage the neck element.

6. A steering system for a bicycle comprising:

a steering post;

a primary set of handlebars coupled to said steering post at a first height;

a neck element;

a clamping assembly for joining said neck element to said steering post; and a secondary handlebar coupled to said neck element, said secondary handlebar having a bar and handle elements that radially extend from said bar wherein said neck element supports said secondary handlebar at a predetermined height above said primary set of handlebars so that said bar is in a horizontal plane.

7. The system according to claim 6, wherein brake controls are disposed on the primary set of handlebars a predetermined distance apart, and said secondary handlebar has a length equal to said predetermined distance.

8. The system according to claim 6, further including at least one adjustment mechanism disposed between said steering post and said secondary handlebar, said at least one adjustment enabling said predetermined height to be selective adjusted.

9. The system according to claim 8, wherein said at least one adjustment includes a pivot adjustment that enables said secondary handlebar to be adjusted relative said primary set of handlebars.

10. The system according to claim 8, wherein said clamping assembly selectively engages said neck element in one of a plurality of positions, wherein the height that said neck element supports said secondary handlebar above said clamping assembly can be selectively adjusted.

11. The system according to claim 8, wherein said neck element includes a clamp that engages said secondary handlebar, wherein said clamp enables said secondary handlebar to be selectively rotated to a selected position within said clamp.

12. The system according to claim 6, further including comfort pads disposed around said bar.

13. The system according to claim 6, wherein said clamping assembly includes a first set of clamping jaws that engage the steering post and a second set of clamping jaws that engage the neck element.

14. On a bicycle having a steering post that supports a primary set of handle bars, a device for attaching a secondary handlebar to the steering post comprising:

a secondary handlebar that includes a bar and handle elements that extend radially from said bar;

a neck element extending from said secondary handlebar;

a clamping assembly that selectively engages the steering post and said neck element to mechanically connect said neck element to the steering post, wherein said clamping assembly can selectively engage said neck element at a plurality of points, thereby enabling said secondary handlebar to be selectively adjusted in position relative said clamping assembly.

* * * * *